United States Patent
Brisson, II et al.

(10) Patent No.: US 7,781,006 B2
(45) Date of Patent: Aug. 24, 2010

(54) FROZEN FOOD PRODUCTION

(75) Inventors: John G. Brisson, II, Rockport, MA (US); Joseph L. Smith, Jr., Concord, MA (US); Teresa S. Baker, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 819 days.

(21) Appl. No.: 11/281,262

(22) Filed: Nov. 17, 2005

(65) Prior Publication Data
US 2006/0159821 A1   Jul. 20, 2006

Related U.S. Application Data

(60) Provisional application No. 60/628,606, filed on Nov. 17, 2004.

(51) Int. Cl.
*A23G 9/46* (2006.01)
(52) U.S. Cl. .................. 426/565; 426/515; 426/519; 426/524; 62/74
(58) Field of Classification Search .............. 426/312, 426/317, 319, 565, 515, 519, 524; 62/1, 62/66, 69, 70, 74
See application file for complete search history.

(56) References Cited

U.S. PATENT DOCUMENTS

| | | | |
|---|---|---|---|
| 1,397,168 A * | 11/1921 | Ingle | 426/477 |
| 1,828,853 A | 10/1931 | Vogt | |
| 2,713,253 A | 7/1955 | Chandler | |
| 3,068,105 A * | 12/1962 | Morrison | 62/70 |
| 3,255,600 A * | 6/1966 | Mitchell et al. | 62/69 |

(Continued)

FOREIGN PATENT DOCUMENTS

DE   2635117 A1   2/1978

(Continued)

OTHER PUBLICATIONS

"Structure of Ice Cream" website, Jul. 11, 1997, www.foodsci.uoguelph.ca/dairyedu/icstructure.html.*

(Continued)

*Primary Examiner*—Drew E Becker
(74) *Attorney, Agent, or Firm*—Wolf, Greenfield & Sacks, P.C.

(57) ABSTRACT

The present invention generally relates to frozen foods, for example, frozen desserts such as ice cream. One aspect of the invention is directed to carbonated frozen desserts and other carbonated frozen foods. Another aspect is directed to methods of making frozen foods, such as carbonated frozen desserts and other foods, as well as methods of freezing other fluids, such as water. A carbonated frozen dessert can be made, for example, by introducing carbon dioxide ($CO_2$) into dessert mix prior to freezing the dessert mix. Yet another aspect of the invention is directed to cooling dessert mixes and other food products by introducing a fluid, such as a refrigerant, into the dessert mix or food product that cools and/or freezes the dessert mix or food product. The fluid may also become incorporated into the frozen dessert or other food product. Still another aspect of the invention is directed to frozen foods, such as ice creams and similar frozen desserts, having smooth consistencies. Other aspects of the invention are directed to apparatuses for making such frozen foods, methods of promoting such frozen foods, and the like.

17 Claims, 4 Drawing Sheets

U.S. PATENT DOCUMENTS

| | | | |
|---|---|---|---|
| 3,404,541 | A | 10/1968 | Bot-Langlet |
| 3,470,706 | A * | 10/1969 | Johnson et al. ............... 62/179 |
| 4,140,736 | A * | 2/1979 | Nielsen et al. ............... 261/30 |
| 4,347,707 | A | 9/1982 | Zemelman et al. |
| 4,457,023 | A | 7/1984 | Easterday |
| 4,487,023 | A | 12/1984 | Hegadorn et al. |
| 4,488,407 | A * | 12/1984 | Delano .......................... 62/74 |
| 4,531,656 | A | 7/1985 | Nitchman et al. |
| 4,703,609 | A * | 11/1987 | Yoshida et al. ................ 53/431 |
| 4,738,862 | A | 4/1988 | Bee et al. |
| 5,055,315 | A | 10/1991 | Bee |
| 5,126,156 | A | 6/1992 | Jones |
| 5,624,700 | A * | 4/1997 | Ogden ......................... 426/564 |
| 5,698,247 | A | 12/1997 | Hall |
| 5,728,419 | A | 3/1998 | Caron et al. |
| 5,783,239 | A | 7/1998 | Callens et al. |
| 5,806,550 | A | 9/1998 | Frank |
| 6,056,791 | A | 5/2000 | Weidner et al. |
| 6,149,951 | A | 11/2000 | Bee et al. |
| 6,248,378 | B1 * | 6/2001 | Ganan-Calvo ............... 426/89 |
| 6,284,302 | B1 * | 9/2001 | Berger et al. ................ 426/524 |
| 6,510,890 | B1 * | 1/2003 | Paskach et al. ................ 165/61 |
| 6,576,276 | B1 | 6/2003 | Gupta et al. |
| 6,858,240 | B2 | 2/2005 | Gupta et al. |
| 2002/0129616 | A1 | 9/2002 | Jones |
| 2003/0126871 | A1 | 7/2003 | Frank et al. |
| 2003/0219521 | A1 | 11/2003 | Gupta et al. |
| 2004/0001905 | A1 | 1/2004 | Campbell et al. |
| 2008/0020099 | A1 | 1/2008 | Birkett et al. |

FOREIGN PATENT DOCUMENTS

| | | |
|---|---|---|
| EP | 0 674 841 A1 | 10/1995 |
| EP | 0 779 034 A1 | 6/1997 |
| EP | 0917825 A2 | 7/1998 |
| EP | 0917825 A | 5/1999 |
| FR | 2195916 | 3/1974 |
| GB | 1227633 | 9/1969 |
| GB | 1227633 A | 4/1971 |
| WO | WO 94/02414 A1 | 2/1994 |
| WO | WO 2004/026756 A | 4/2004 |
| WO | WO 2004/026756 A1 | 4/2004 |

OTHER PUBLICATIONS

"Homogenized Milk" website, Sep. 29, 2000, www.newton.dep.anl.gov/asksci/gen99/gen99499.htm.*

Genov, G. et al., "Experimental studies on the formation of porous gas hydrates," *American Mineralogist*, vol. 89, pp. 1228-1239, 2004.

Stefan Chomka, "Unilever Develops Cool New Ice Cream Formats" The Grocer, Jul. 12, 2008, p. 64; www.thegrocer.co.uk.

International Search Report dated Oct. 2, 2006 in PCT/US2004/041657.

The Grocer, "Product News: Unilever develops cool new ice cream format" www.thegrocer.co.uk (Jul. 12, 2008).

Chapoy et al. "Measured and molding of gas solubility and literature review of the properties for the carbon dioxide—water system", *Ind. Eng. Chem. Res.*, vol. 43:1794-1802 (2004).

Cogne et al. "Experimental data and modelling of ice cream freezing", *Trans. IChemE*, vol. 81, Part A:1129-1135 (2003).

Wright et al. "Determination of carbonation threshold in yogurt", *J. of Food Sc.*, vol. 68, No. 1:378-381 (2003).

Krasner "MIT cyrogenic engineering laboratory makes a new type of ice cream that goes 'whoof' on your tongue", *The Tech*, p. 12 (Aug. 29, 2005).

Krasner "MIT crew churns out ice cream with sizzle" *Boston Globe* (Aug. 28, 2005).

Carroll et al. "The solubility of carbon dioxide in water at low pressure", *J. Phys. Chem. Ref. Data*, vol. 20, No. 6:1201-1209 (1991).

Air liquide, "New spraying method for producing a fine fat powder" *Food Tech*.

- http://www.findarticles.com/p/articles/mi_m1590/is_14_58/ai_86170477, last accessed Sep. 21, 2005.

- http://www.recipecottage.com/desserts-frozen/champagne-sorbet.html, last accessed Sep. 16, 2005.

- http://www.fizzyfruit.com/FAQ.html, last accessed Nov. 1, 2005.

- http://www.seaham-hall.com/Events_Details.asp?uid=876371296, last accessed Sep. 21, 2005.

Botelho, G., "Getting fizzy with it: Carbonated foods bubble up," http://www.cnn.com/2007/US/05/22/carbonated.food/index.html, printed Oct. 20, 2009.

Calix et al., "Measurement of High-Pressure Carbon Dioxide Solubility in Orange Juice, Apple Juice, and Model Liquid Foods," *J Food Sci.*, (2008); vol. 73, Nr. 9, p. E439-E445.

Chun et al., "Interfacial Tension in High-Pressure Carbon Dioxide Mixtures," *Ind. Eng. Chem. Res.*, (1995); V 34, p. 4371-4377.

Glasner, J., "All That Fizzes Is Not Soda," http://www.wired.com/print/techbiz/media/news/2005/10/69017, printed Oct. 20, 2009.

Hindmarsh et al., "Fundamentals of the spray freezing of foods—microstructure of frozen droplets," *J. Food Eng.*, (2005), p. 1-15.

Hindmarsh et al., "Experimental and numerical analysis of the temperature transition of a freezing food solution droplet," *Chem. Eng. Sci.*, (2004); 59:2503-2515.

Hindmarsh et al., "Experimental and numerical analysis of the temperature transition of a suspended freezing water droplet," *Int'l J. Heat and Mass Transfer*, (2003); 46:1199-1213.

Hofland et al., "Isoelectric Precipitation of Casein Using High-Pressure $CO$," *Ind. Eng. Chem. Res.*, (1999); 38:12, 4919-4927.

Hofland et al., "Isoelectric precipitation of soybean protein using carbon dioxide as a volatile acid," *J. Chromatography B.*, (2000); 743:357-368.

Ma et al., "Effect of Temperature of $CO_2$ Injection on the pH and Freezing Point of Milks and Creams," *J. Dairy Sci.*, (2003); 86:1578-1589.

Taylor et al., "Carbonation of Viscous Fluids: Carbon Dioxide Holding Capacity and Rate to Saturation of Simulated Yogurt," *J. Food Sci.*, (2002); vol. 67, Nr. 3, p. 1032-1035.

Tomasula et al., "Measurement of the solubility of carbon dioxide in milk at high pressures," *J Supercritical Fluids*, (1999) 16:21-26.

Wright et al., "Determination of Carbonation Threshold in Yogurt, "*J Food Sci.*, (2003); vol. 68, Nr. 1, p. 378-381.

David Lopez Thesis, "Development of a Pressurized Low-Temperature Tablet Press for a Carbon Dioxide Flash Frozen Ice Confection" Sep. 2009, Massachusetts Institute of Technology.

Teresa Baker Peters Thesis, "Clathrate Hydrates in Frozen Confections: Formation by Carbon Dioxide Flash Freezing and Behavior During Distribution and Consumption" Sep. 2009, Massachusetts Institute of Technology.

* cited by examiner

FROZEN FOOD PRODUCTION

RELATED APPLICATIONS

This application claims the benefit of U.S. Provisional Patent Application Ser. No. 60/628,606, filed Nov. 17, 2004, entitled "Ice Cream Production Using Carbon Dioxide Expansion," by Brisson, et al., which application is incorporated herein by reference.

FIELD OF INVENTION

The present invention generally relates to frozen foods, for example, frozen desserts such as ice cream.

BACKGROUND

Figure 1:
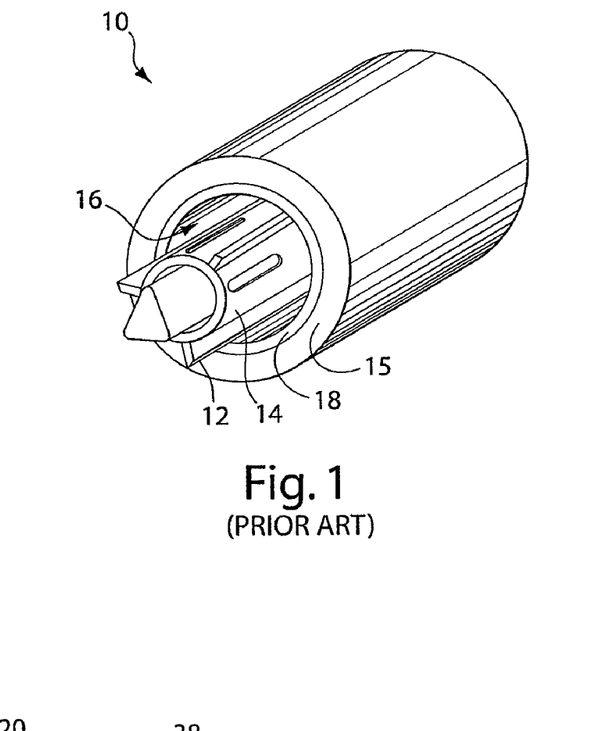
FIG. 1 illustrates a commercial ice cream barrel freezer.

Ice cream has been made essentially the same way since Nancy Johnson invented the hand-cranked freezer in 1846. A schematic of a typical commercial ice cream barrel freezer 10 is shown in FIG. 1. In a typical procedure, a scraper-dasher assembly having several scrapers 12 and a dasher 14 is rotated on its axis inside a refrigerated pipe 15. In the process, ice cream precursor (for example, cream) is passed through an annular space 16 between the dasher 14 and the refrigerated pipe 15. Air is injected into the barrel freezer so that it is incorporated into the cream. The cream freezes on the wall 18 of the pipe to form the ice cream, and is scraped off the walls by the scrapers 12. The size of the ice crystals and the consistency of the ice cream is influenced by the speed of the scrapers and the clearance between the scrapers and the walls. Since small crystals are desirable (for a higher quality creamy ice cream) the clearances between the blades and the walls are necessarily small. This, combined with the large forces on the dasher, can make the system somewhat expensive.

In addition, the crystals that have been scraped off the walls of the refrigerated pipe can grow under some conditions within the mixture in the volume of the annulus (for example, due to poor temperature control), and this effect can reduce the quality of the ice cream exiting the barrel freezer. The ice cream exits the barrel freezer, typically with the consistency of soft-serve ice cream, where about 50% of the water in the ice cream is in a frozen state. Subsequently, the ice cream is cooled, for example by passing it through a blast freezer to reduce the temperature of the mixture to, e.g., below about −25° C., to arrest the crystal growth process within the ice cream. In this process, the ice cream is generally hardened.

There are also continuous-feed auger-driven heat exchangers that can be used to post-process and cool the ice cream (e.g., below −25° C.) after processing of the ice cream within the barrel freezer. These systems typically physically break down the ice crystals in the ice cream even further, resulting in a creamier (and more desirable) ice cream. Because of high shear forces typically required in these devices, and the increasing effective viscosity of the ice cream caused via this process, these systems typically consume substantial amounts of power, and are relatively complex and expensive to build and maintain.

The relative uniformity of ice cream production, since its invention, provides room for modifications or improvements in this process and in ice cream and other frozen foods, such as frozen desserts.

SUMMARY OF THE INVENTION

The present invention generally relates to frozen foods, for example, frozen desserts such as ice cream. The subject matter of the present invention involves, in some cases, interrelated products, alternative solutions to a particular problem, and/or a plurality of different uses of one or more systems and/or articles.

In general, the invention provides frozen food products that can have interesting and/or unusual qualities, detectable by a human upon consumption, which can be pleasant and/or attractive. For example, the products can be produced and/or packaged so as to have a degree of carbonation (carbon dioxide content) detectable by a human upon consumption in the form of a "tanginess" and/or other sensation of the presence of carbon dioxide gas, released upon consumption, that is sometimes associated with the consumption of carbonated beverages. In other aspects the invention provides food products produced and/or packaged so as to have a very light, "fluffy" consistency or form, similar to finely-divided "powdery" snow. In this aspect the product has a void volume fraction that is higher than (density that is lower than) typical similar food products. In another aspect the invention provides a series of unique methods for making these and other food products. The methods are characterized by one or more of: good mixing of product precursor through newly-applied techniques for achieving these products, freezing of products by expansion and/or phase change of a carrier fluid (e.g., carbon dioxide or another substance that becomes a gas upon sufficient exposure to typical room temperature and pressure), and other techniques.

One aspect of the invention is directed to a carbonated frozen ice cream product. For instance, in one embodiment, the invention is directed to carbonated ice cream.

Another aspect of the invention is directed to an article. In one set of embodiments, the article includes a food product that is frozen by phase change and/or expansion of $CO_2$ during a gradient in pressure applied to a mixture of the food product and the $CO_2$. The frozen food product may also, in some cases, comprise carbon dioxide in an amount detectable by a human upon consumption of the frozen food product by the human. Upon sufficient exposure to ambient temperature and pressure, the food product may be thawed to a substantially liquid state in some instances.

In another set of embodiments, the article includes a food product comprising particles having an average cross-sectional dimension of less than about 500 micrometers. The food product, in some instances, may contain $CO_2$ in an amount detectable by the human upon consumption of the food product by the human. The article, according to still another set of embodiments, includes a frozen food product having an effective thermal conductivity of between about 0.05 W/m K and about 5 W/m K.

According to yet another one set of embodiments, the article includes a container pressurized to a pressure greater than about 2 atmospheres (absolute). The container may contain a frozen dessert or other food product. In another set of embodiments, the article may comprise an ice cream product, or other food product, packaged at a pressure greater than 2 atmospheres (absolute). The ice cream or other food product may include carbon dioxide in an amount that is detectable by a human upon consumption of the food product by the human. The article, according to still another set of embodiments, includes a frozen food product comprising solid $CO_2$ in an amount detectable by the human upon consumption of the frozen food product by the human.

Yet another aspect of the invention is directed to an apparatus. In one set of embodiments, the apparatus includes a source of ice cream product mix, a source of $CO_2$, a first nozzle in fluid communication with the source of ice cream mix, a first chamber that the first nozzle is able to spray into, where the first chamber being in fluidic communication with the source of $CO_2$, a second nozzle in fluidic communication an outlet of the first chamber, and a second chamber that the second nozzle is able to spray into.

In still another aspect, the invention is a method of making a food product, such as a frozen food product. In one set of embodiments, the method includes acts of passing at least $CO_2$ and/or a food product through a first nozzle to produce a mixture of $CO_2$ and food product, where the mixture includes at least one discontinuous phase formed of discrete regions, and passing the mixture of $CO_2$ and food product through a second nozzle under conditions that create, in the mixture, a pressure gradient at least sufficient to cause a phase change in at least a portion of the mixture and/or an expansion of the $CO_2$ at least sufficient to substantially freeze at least a portion of the food product.

The method, in another set of embodiments, includes acts of passing at least a refrigerant and/or a food product through a first nozzle to produce a mixture of refrigerant and food product, where the refrigerant is gaseous under ambient temperature and pressure, and volumetrically expanding the mixture of refrigerant and food product through a pressure gradient at least sufficient to cause a phase change in at least a portion of the mixture and/or an expansion of the refrigerant at least sufficient to substantially freeze at least a portion of the food product.

In still another set of embodiments, the method includes acts of forming a mixture comprising at least $CO_2$ and a food product, where the mixture includes at least one discontinuous phase comprising the $CO_2$ and has an average cross-sectional dimension of less than about 1 mm, and passing the mixture of $CO_2$ and food product through a nozzle under conditions that create, in the mixture, a pressure gradient at least sufficient to cause a phase change in at least a portion of the mixture and/or an expansion of the $CO_2$ at least sufficient to substantially freeze at least a portion of the food product.

The method, according to yet another set of embodiments, includes acts of forming a mixture comprising at least $CO_2$ and a food product, where the food product is present in the mixture as one or more discontinuous phases, and where each of the one or more discontinuous phases within the mixture is formed of discrete regions having an average cross-sectional dimension of less than about 1 mm, and passing the mixture of $CO_2$ and food product through a nozzle under conditions that create, in the mixture, a pressure gradient at least sufficient to cause a phase change in at least a portion of the mixture and/or an expansion of the $CO_2$ at least sufficient to substantially freeze at least a portion of the food product.

According to still another set of embodiments, the method includes acts of forming a mixture comprising at least $CO_2$ and a food product, where the mixture includes at least one discontinuous phase formed of discrete regions, and passing the mixture of $CO_2$ and food product through a nozzle under conditions that create, in the mixture, a pressure gradient at least sufficient to cause a phase change in at least a portion of the mixture and/or an expansion of the $CO_2$ at least sufficient to substantially freeze at least a portion of the food product. In some cases, the discontinuous phase of the mixture, prior to passage through the nozzle, is formed of discrete regions having an average cross-sectional dimension no more than about 200% of the smallest cross-sectional dimension of the nozzle.

In yet another set of embodiments, the method includes acts of forming a mixture comprising at least $CO_2$ and a food product, reducing pressure on the mixture at a rate at least sufficient to cause a phase change in at least a portion of the mixture and/or an expansion of the $CO_2$ at least sufficient to substantially freeze at least a portion of the food product, and placing the food product in a container. In some instances, the temperature and pressure of the container are selected such that the container can be used to deliver the food product to a human for consumption such that, upon consumption by the human, a level of carbon dioxide detectable by the human is present in the food product.

The method, in still another set of embodiments, includes acts of forming a mixture comprising at least $CO_2$ and a food product, where the mixture includes a discontinuous phase, and passing the mixture of $CO_2$ and food product through a nozzle under conditions that create, in the mixture, a pressure gradient at least sufficient to freeze at least a portion of the $CO_2$ in the mixture.

In one aspect, the invention is directed to a method of cooling a food product with a refrigerant to form a frozen food product. In some cases, the frozen food product, when consumed by a human, contains at least 400 ppm of refrigerant.

The method includes, in another aspect, an act of expanding a mixture comprising at least liquid $CO_2$ and an ice cream product mix to a volume at least sufficient to freeze at least a portion of the ice cream product. In still another aspect, the method includes an act of introducing liquid $CO_2$ into an ice cream mix to produce a carbonated ice cream product.

In still another aspect, the invention is a method that includes acts of passing $CO_2$ and ice cream product mix through a first nozzle to produce an emulsified fluid, and passing the emulsified fluid through a second nozzle.

In another aspect, the present invention is directed to a method of making one or more of the embodiments described herein, for example, to the production of frozen foods, for instance, frozen desserts such as carbonated frozen desserts. In yet another aspect, the present invention is directed to a method of using one or more of the embodiments described herein, for example, to the production of frozen foods, for instance, frozen desserts such as carbonated frozen desserts.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

The present invention generally relates to frozen foods, for example frozen desserts such as ice cream, and processes for making food products, all as defined generally in the Summary above, and discussed herein. One aspect of the invention is directed to carbonated frozen desserts and other carbonated frozen foods. Another aspect is directed to methods of making frozen foods, such as carbonated frozen desserts and other foods, as well as methods of freezing other fluids, such as water. A carbonated frozen dessert can be made, for example, by introducing carbon dioxide ($CO_2$) into a dessert mix prior to or during freezing the dessert mix. Still another aspect of the invention is directed to frozen foods, such as ice creams and similar frozen desserts, having smooth consistencies. Other aspects of the invention are directed to apparatuses for making such frozen foods, methods of promoting such frozen foods, and the like.

Yet another aspect of the invention is directed to cooling dessert mixes and other food products by introducing a fluid, such as a refrigerant, into the dessert mix or food product that cools and/or freezes the dessert mix or food product. At least a portion of the fluid (which can include one that is a gas at atmospheric pressure and ambient room temperature conditions) may also become incorporated into the frozen dessert or other food product.

For example, in one embodiment of the invention, a fluid such as $CO_2$ is mixed with dessert mix such as an ice cream mix (which may include some or essentially all components of the dessert, except whatever $CO_2$ is incorporated into the mix by the process) to form a mixture, for instance, by spraying the dessert mix through a nozzle or orifice into $CO_2$ (i.e., from a region of relatively higher pressure to a region of relatively lower pressure), by spraying $CO_2$ through a nozzle or orifice into the dessert mix, by mixing the $CO_2$ and the dessert mix and urging the mixture through a nozzle or orifice, etc. Subsequently, the mixture can be sprayed through a second nozzle (or urged through a second orifice) from a region of relatively higher to a region of relatively lower pressure, under conditions in which the dessert mix is (in part or in full) frozen as the $CO_2$ changes phase and/or expands and cools during the second spraying step. The $CO_2$ can cool and/or freeze the dessert mix, and can then be separated from the frozen dessert (i.e., the $CO_2$ can evaporate or sublimate), and/or some or all of the $CO_2$ can itself freeze and become incorporated within the frozen dessert. For example, the $CO_2$ may be in the form of solid particles mixed within the frozen dessert, and/or some or all of the $CO_2$ can co-solidify with the frozen dessert in the form of solid (frozen) particles including some frozen dessert mix and some $CO_2$.

In cases where some or all of the $CO_2$ is contained within the frozen dessert (e.g., as a solid), the resulting frozen dessert is "carbonated," i.e., having certain unique edible properties as described more fully below. Additionally, in some cases, the frozen dessert can be stored under conditions (e.g., controlling temperature, pressure, or a combination) maintaining some or all of the "carbonation" until such time as the frozen dessert is served for consumption. The process described briefly above is not intended to be limiting, and this and other processes are described below in greater detail in a manner such that, in view of the overall disclosure, those of ordinary skill in the art can readily select equipment and conditions suitable for performing any of the embodiments described in detail herein.

A series of definitions, parameters, and other conditions are now described to facilitate a better understanding of the invention. A "frozen food," or a "frozen food product," as used herein, is a food that is typically served eaten while the food is still in a frozen, solid state. Thus, a "frozen food" does not include food that is stored in the frozen state, but is not typically eaten while still in that frozen state. The frozen food product may also be distinguished from other food products in that, upon sufficient exposure to ambient temperature and pressure air (i.e., 25° C. and 1 atm), the frozen food product thaws to form a substantially liquid or amorphous state. One non-limiting example of a frozen food is a frozen dessert.

As used herein, a "frozen dessert" is a dessert that is typically served, and is edible (without any heating), while the dessert is near or below the freezing point of water (0° C.). Non-limiting examples of frozen desserts include ice cream, sherbets, sorbets, ice milk, frozen custard, frozen yogurt (or "froyo"), gelato, French ice cream, French custard ice cream, frozen malted milk, frozen milk shakes, or the like. (It should be noted, as used herein, that terms relating to various desserts, such as "sherbet" and "gelato," are given their ordinary and customary U.S. definitions.)

The frozen dessert is usually prepared from a dessert mix that is prepared and then frozen to a temperature below the freezing point of water. The desert mix may contain various ingredients, such as milk, sweeteners (e.g., corn syrup, sugar, etc.), eggs, flavorings, emulsifiers (e.g., egg yolks, monoglycerides, diglycerides, Polysorbate 80, etc.), stabilizers (e.g., guar gum, carageenan, etc.), etc., depending on the type of frozen dessert to be prepared from the dessert mix, and will be readily identifiable to those of ordinary skill in the art.

The frozen dessert may also be categorized based on the amount of milk, sweetener, eggs, etc. that are present. In some cases, no milk is present within the frozen dessert. In other cases, if the frozen dessert contains milk or other dairy products, or a milk substitute such as soymilk or lactose-free milk, the frozen dessert can be categorized as an "ice cream product." Examples of ice cream products include, but are not limited to, ice cream, ice milk, frozen custard, sherbets, mellorines, frozen yogurts, frozen malted milk, frozen milk shakes, or gelatos. An ice cream product having greater than about 10% milk fat may be categorized as an "ice cream," while an ice milk or a sherbet may have less than about 10% milk fat. A frozen custard may also have greater than about 10% milk fat, and at least 1.4% egg yolk.

The ice cream product, or other frozen food or frozen dessert, may, of course, also contain a variety of additives, for example, flavorings, sweeteners, stabilizers, emulsifiers, nuts, chocolate, berries, and the like. Those of ordinary skill in the art will be able to identify the food products described above, e.g., ice cream, ice cream products, frozen desserts, and other frozen foods, for example, as defined in Title 21 of the U.S. Code of Federal Regulations, promulgated by the U.S. Food and Drug Administration, and/or as defined in various state statutes and regulations, or the like.

In some cases, the frozen food can be consumed by a human without causing a "bite," i.e., the effective thermal conductivity of the frozen food is such that a human eating the frozen food product will not experience an uncomfortable, generally rapid decrease in temperature (e.g., by at least about 10° C. or 20° C.) within the mouth after inserting the frozen food into the mouth. The effective thermal conductivity can be determined using techniques known to those of ordinary skill in the art. For instance, one method of measuring the effective thermal conductivity of a material is to create a temperature gradient across a column of material (i.e., such that one end of the column is initially at a first temperature, and the other end of the column is initially at a second temperature), and then measuring the heat flux through the column of material to determine the effective thermal conductivity of the material. It should be noted that the effective thermal conductivity will include contributions not only from the material itself (e.g., the frozen food), but also from gases that may be present within the material. In some embodiments, lower effective thermal conductivities can be achieved as the frozen food is in a "fluffy" state, i.e., formed of relatively small particles or crystals. In certain cases, the effective thermal conductivity of the frozen food is between about 1 W/m K and about 0.01 W/m K. For example, the effective thermal conductivity of the frozen food may be between about 0.05 W/m K and about 0.5 W/m K, between about 0.1 W/m K and about 0.4 W/m K, or between about 0.1 W/m K and about 0.3 W/m K.

Thus, in many cases, the frozen dessert or other frozen food is formed of relatively small particles, which may be crystals in some cases. This food product may be produced using the process described herein of fluid expansion and cooling and/or phase change, which may cause cooling and/or freezing of a mixture of the fluid and a food product (such as a dessert mix), for example, an emulsion of the fluid and the food product. The particles or crystals within the frozen food may provide the frozen food with a smooth, creamy texture. For example, the particles or crystals within the frozen food may have an average dimension of less than about 500 micrometers, less than about 400 micrometers, less than about 300 micrometers, less than about 200 micrometers, less than about 100 micrometers, less than about 75 micrometers, less than about 60 micrometers, less than about 50 micrometers, less than about 40 micrometers, less then about 30 micrometers, less than about 20 micrometers, less than about 10 micrometers, or less than about 5 micrometers.

The presence of relatively small particles or crystals within the frozen food may give the frozen food a "smooth" or "creamy" consistency, relative to similar commercially-available frozen foods, even without the presence (or a reduced presence) of smoothing additives or various types of fat that are commonly used commercially, or the use of relatively complex and expensive mechanical processes for reducing particle size. As discussed in more detail below, the particle or crystal size within the frozen food may be controlled, for example, by controlling the rate at which the frozen food is formed and/or cooled. For example, frozen foods having relatively small particles or crystals are created in certain embodiments by rapidly cooling a mixture of a fluid, such as carbon dioxide, and a food product, for example, by urging the mixture through a nozzle, as discussed below. In some cases, when carbon dioxide is used in this process, some of the carbon dioxide may also become part of the frozen food, and in some cases, enough carbon dioxide becomes part of the frozen food that the frozen food product is carbonated.

Thus, one aspect of the invention provides a carbonated frozen food. Examples of carbonated frozen foods include, but are not limited to, carbonated frozen desserts, for example, carbonated ice cream products, carbonated ice cream, carbonated sherbet, carbonate sorbet, or the like. As used herein, a "carbonated" frozen food is a frozen food in which a detectable or "tasteable" amount of carbon dioxide is present, i.e., the carbon dioxide within the frozen food can be tasted by an ordinary human upon consumption of the frozen food by the human, for example, as a "tang," "sharp," "fizzy," or "bubbly" sensation within the frozen food. A level of carbon dioxide detectable by a human, upon consumption, can readily be determined by those of ordinary skill in the art by allowing even a small sampling of humans to taste such a product in comparison to, e.g., a product that has not been produced in accordance with one of the methods of the invention (e.g., produced via a carrier expansion and/or phase change cooling method where the carrier is, e.g., an inert gas such as argon, and/or a product that has been allowed to stand at typical room temperature and pressure conditions for a period of time sufficient to allow carbon dioxide to escape), and allowing the humans to indicate whether a detectable level of carbon dioxide is present in the product.

A "carbonated" frozen food product can also be characterized as a product food in which, when the food product is melted and allowed to stand for a period of time sufficient to release any carbon dioxide present (e.g., by exposing the food product to ambient temperature and/or pressure air), the release of carbon dioxide from the food product is in an appreciable amount, i.e., more than that which otherwise would occur naturally in the food product. In certain instances, the food product, when melted, will become substantially devoid of $CO_2$, i.e., the food product contains only $CO_2$ that is in equilibrium with the atmosphere, which is typically undetectable by a human if consumed.

In some embodiments, the amount of carbon dioxide within the frozen food product is at least about 300 ppm (on a volumetric basis), and in other embodiments, at least about 350 ppm, at least about 400 ppm, at least about 450 ppm, at least about 500 ppm, at least about 550 ppm, or at least about 600 ppm. The amount of carbon dioxide within the carbonated frozen food product may also be determined on a mass basis, instead of a volumetric basis. In some embodiments, the amount of carbon dioxide within the frozen food product is at least about $3 \times 10^{-7}$ kg $CO_2$/kg ice cream, and in other embodiments, at least about $5 \times 10^{-7}$ kg $CO_2$/kg ice cream, $7 \times 10^{-7}$ kg $CO_2$/kg ice cream, $10^{-6}$ kg $CO_2$/kg ice cream, $3 \times 10^{-6}$ kg $CO_2$/kg ice cream, $5 \times 10^{-6}$ kg $CO_2$/kg ice cream, or $7 \times 10^{-6}$ kg $CO_2$/kg ice cream. Thus, ambient air (e.g., at atmospheric pressure) contained within a frozen food would not render the frozen food "carbonated," as the carbon dioxide within ambient air (for example, within a gas bubble trapped within the frozen food or dessert) would not be detectable, i.e., tasteable, to the ordinary human. Some examples of the preparation of carbonated frozen desserts and other carbonated frozen foods are described in more detail below.

The carbon dioxide contained within the carbonated frozen food may be present in any suitable form, for example, trapped within liquid or gaseous "bubbles" within the frozen food, and/or dissolved or embedded within the frozen food, etc. The carbon dioxide, in some embodiments, the carbon dioxide may be present as a solid solution (e.g., in the form of solid or frozen particles including some frozen food and some $CO_2$), and/or as solid carbon dioxide particles or "dry ice" contained within the frozen food, etc. In certain cases, the carbon dioxide may be present in the gaseous phase within the frozen food, for example, entrapped within bubbles. In some instances, the carbon dioxide may also be present within the carbonated frozen food in more than one of these forms and/or in more than one phase.

In some cases, the carbon dioxide may be present within the carbonated frozen food at a concentration of at least about 0.03 mmol $CO_2$/g food, and in other cases, at least about 0.05 mmol $CO_2$/g food, at least about 0.07 mmol $CO_2$/g food, at least about 0.1 mol $CO_2$/g food, or at least about 0.2 mol $CO_2$/g food.

The carbonated frozen food can be stored under pressure in some embodiments. For example, the carbonated frozen food may be stored in an environment having a pressure greater than about 1 atm (absolute), for example, greater than about 1.1 atm, greater than about 1.2 atm, greater than about 1.4 atm, greater than about 1.6 atm, greater than about 1.8 atm, greater than about 2.0 atm, greater than about 3.0 atm, greater than about 4.0 atm, or greater than about 5.0 atm, etc. The increased pressure may allow the carbonated frozen food to retain its carbonation longer, for example, during production, packaging, storage, transport, distribution, etc., of the frozen food, for example, such that the carbonated frozen food can be delivered to a human for consumption under conditions such that the human can detect the carbonation within the carbonated frozen food while consuming it. In some cases, the carbonated frozen food is stored in a container able to retain a pressure greater than about 1 atm, greater than 1.1 atm, etc, as described above. For example, the container may be made out of a metal, such as aluminum or tin, plastic, glass, or the like, and those of ordinary skill in the art will know of techniques for manufacturing suitable pressurizable containers. The increased pressure within the container may be created using air, $CO_2$, an inert gas, or the like.

In certain embodiments, the carbonated frozen food is stored at a temperature able to keep the frozen food in a substantially solid or frozen state (either under atmospheric pressure (1 atm), or at greater pressures in some cases, as discussed above). For example, the temperature at which the carbonated frozen food is stored (i.e., the temperature of the environment containing the carbonated frozen food) may be near or below the freezing point of water (0° C.), for example, in a freezer at –4° C., or at colder temperatures, for instance, near or below about –4° C., near or below about –25° C., near or below about –50° C., or near or below about –80° C., etc. Devices able to refrigerate at such temperatures are well-known in the art. In some cases, the carbonated frozen food is stored at temperatures and/or pressures able to keep the carbon dioxide within the carbonated frozen food as a liquid or as a solid. In some cases, the carbonated frozen food may be stored at several temperatures and/or pressures before being consumed (e.g., during production, packaging, storage, transport, distribution, etc.). Of course, it should be understood that the temperature(s) and/or pressure(s) at which the carbonated frozen food is stored is not necessarily the temperature and pressure at which the carbonated frozen food product is eventually served to a human for consumption.

Another aspect of the invention is generally directed to techniques of producing frozen foods including, but not limited to, carbonated frozen desserts, such as carbonated ice cream products and the like, e.g., as described herein. As generically schematically illustrated in FIG. 2, in some embodiments, additive fluid 151 is mixed 153 with food product 152 to form a mixture, for example, an emulsion. In certain embodiments, the additive fluid mixed with the food product is at a temperature lower than the food product when the additive fluid contacts the food product.

Figure 2:
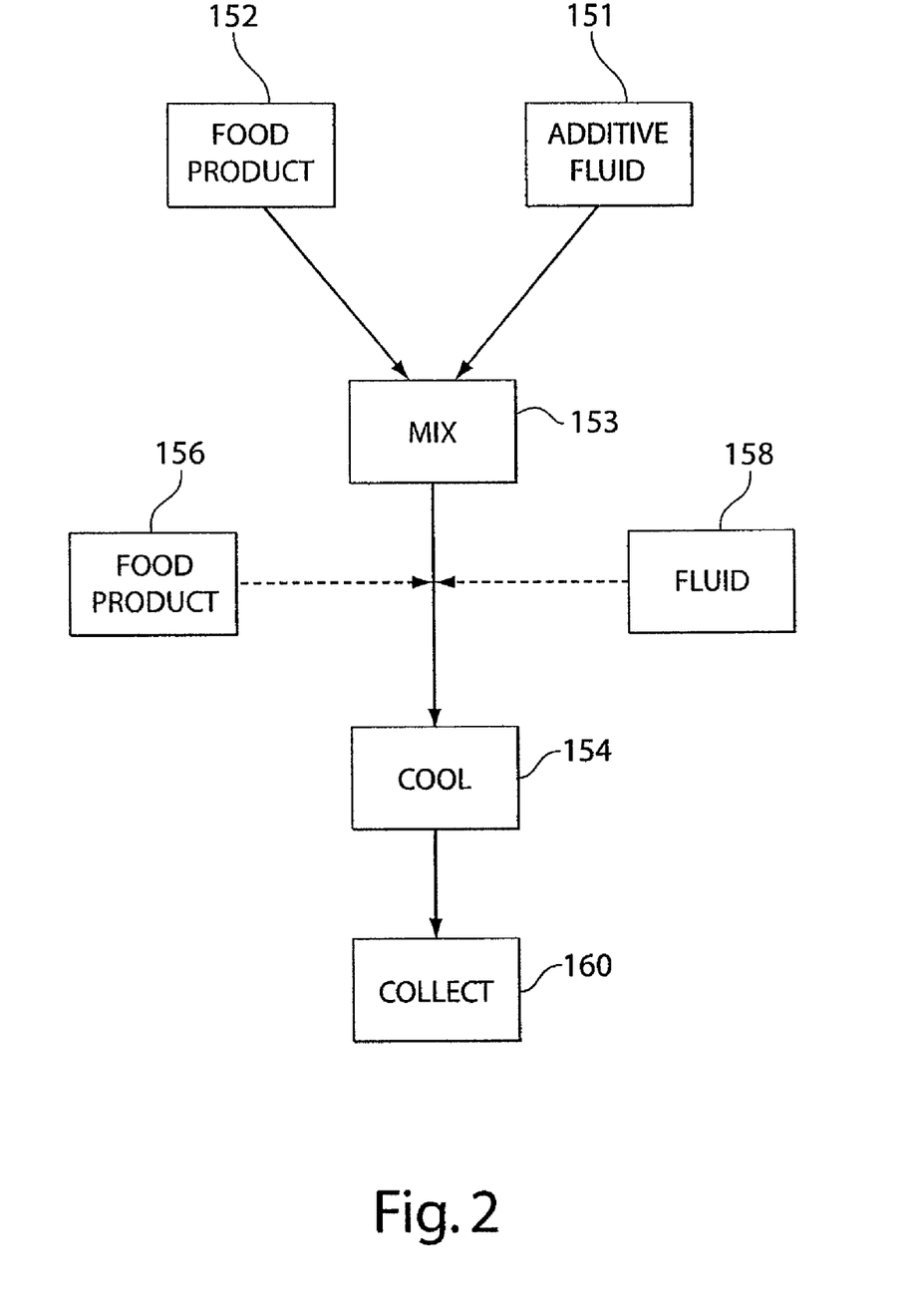
FIG. 2 illustrates a method of producing ice cream, according to one embodiment of the invention.

After mixing, the temperature of the mixture is lowered until at least a portion of the food product solidifies 154. Optionally, more additive fluid 158 and/or food product 156 is added (and additive fluid 158 and food product 156 may be the same or different from food product 152 and additive fluid 151, respectively). The temperature of the mixture is lowered, in certain cases, by urging the mixture through a nozzle or an orifice through a pressure gradient from a region of relatively higher pressure to a region of relatively lower pressure, i.e., across a pressure drop. The frozen food, or at least a portion of the food that substantially freezes, is then collected 160. The pressures may be controlled using any suitable technique known to those of ordinary skill in the art, for example, using a backpressure regulator.

The additive fluid may be any substance that tends to flow and to conform to the outline of a container holding the fluid. Typically, fluids are materials that are unable to withstand a static shear stress, and when a shear stress is applied, the fluid experiences a continuing and permanent distortion. Additionally, the fluid may cool when passed through a pressure gradient from a region of relatively higher pressure to a region of relatively lower pressure, e.g., such that the pressure gradient causes the fluid to expand and cool, and/or change phase (e.g., to a gas) upon expansion. The fluid may have any suitable viscosity that permits at least some flow of the fluid. Non-limiting examples of fluids include liquids and gases, but may also include free-flowing solid particles, viscoelastic fluids, and the like. The additive fluid, in certain cases, may also be insoluble or sparingly soluble in the food product, which is often aqueous.

The additive fluid, upon expansion, may be separable from the frozen food in some embodiments. For example, the additive fluid may be a gas, and/or change phase to form a gas, which can be evolved and separated from the frozen food. In certain cases, the additive fluid is gaseous under ambient temperature and/or pressure. For instance, the additive fluid may be added to the food product as a solid or a liquid, and allowed to undergo a change of phase (e.g., across a pressure gradient) to a liquid or a gas. Such a phase change may also be used to cool and/or freeze the food product. In certain cases, a portion of the additive fluid may also become incorporated within the frozen food. For example, the amount of additive fluid within the frozen food may be at least about 300 ppm (on a volumetric basis), and in other embodiments, at least about 350 ppm, at least about 400 ppm, at least about 450 ppm, at least about 500 ppm, at least about 550 ppm, or at least about 600 ppm. In some cases, the additive fluid is used as a refrigerant, i.e., the additive fluid is used to cool at least a portion of the food product for form a frozen food product, as further discussed herein.

Thus, the additive fluid, in some embodiments, should be non-toxic and/or be able to be incorporated within the frozen food in amounts that are generally regarded as safe (for example, a fluid material designated as a GRAS material by the U.S. Food and Drug Administration). One example of a suitable fluid is carbon dioxide. Another, non-limiting example is ethylene. In some embodiments, the additive fluid is not liquid nitrogen, and/or the additive fluid has a temperature greater than about 80 K or about 70 K, i.e., the fluid is not a "cryogenic" fluid.

The additive fluid may be added to the food product in any suitable form to form a mixture, such as an emulsion. For example, the additive fluid may be added as a gas, as a liquid, as a solid, or the like. In addition, the additive fluid may be mixed with the food product using any suitable technique, for example, using stirring and/or emulsification techniques. Those of ordinary skill in the art will be able to routinely identify suitable techniques for mixing two fluids together. Any ratio of additive fluid to food product may also be used. For example, the mixture of additive fluid and food product may comprise about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% of additive fluid.

In some cases, the additive fluid, when contacting the food product, is at a temperature below the temperature of the food product (which may be at room temperature, i.e., about 25°

C., or at a different temperature), and such contacting may be used to cool the food product. The temperature of the additive fluid, in some cases, is selected to cool but not substantially freeze the food product. As an example, the temperature of the additive fluid may be selected such that the temperature of the additive fluid and the food product, upon mixing, is greater than the liquid-solid transition temperature of the mixture, and thus remains substantially or completely liquid. For example, the temperature of the mixture, after mixing, may be desired to be about 5° C., about 3° C., or about 2° C. Those of ordinary skill in the art will know of suitable techniques for appropriately cooling the additive fluid and/or the food product. For example, a heat exchanger or a refrigerator may be used to cool the additive fluid and/or the food product. Those of ordinary skill in the art will also be able to select a suitable temperature of the additive fluid prior to mixing, based on the quantities, flow rates, heat capacities, etc. of the additive fluid and the food product, using nothing more than routine skill.

The additive fluid and/or the food product may be under pressure in some cases (i.e., under a pressure greater than normal atmospheric pressure, about 1 atm). In other cases, however, the additive fluid is not added to the food product under pressure. However, the mixture of the additive fluid and the food product can also be subsequently pressurized. In some embodiments, the additive fluid and the food product are pressurized at a pressure significantly higher than atmospheric pressure, and such pressurization may occur before, during, and/or after mixing of the additive fluid and the food product. For example, the additive fluid and the food product may be pressurized to a pressure of at least about 5 atm, at least about 10 atm, at least about 15 atm, at least lo about 20 atm, at least about 25 atm, at least about 30 atm, at least about 40 atm, or at least about 50 atm. For instance, if $CO_2$ is used as the additive fluid, the mixture of $CO_2$ and food product may be pressurized such that at least a portion of the $CO_2$ is, or becomes, liquid when contacted with the food product. As known by those of ordinary skill in the art, the actual pressure at which $CO_2$ becomes a liquid is also a function of temperature and can be determined, for example, using a $CO_2$ phase diagram.

In certain embodiments, the mixture may also be cooled, i.e., during or after mixing of the additive fluid and the food product. For instance, the mixture may be cooled to a temperature greater than the liquid-solid transition temperature of the mixture, or to a specific temperature, e.g., about 5° C., about 3° C., or about 2° C. In some cases, the mixture may be cooled simultaneously with pressurization. For instance, if $CO_2$ is used as the additive fluid, pressurization and cooling may occur simultaneously to cause at least a portion of the $CO_2$ in the mixture to become liquid. Of course, in other embodiments, pressurization and cooling do not occur simultaneously. Those of ordinary skill in the art will know of suitable techniques for cooling the additive fluid and the food product, for example, using a heat exchanger or a refrigerator.

In some cases, various components may be added to the mixture as well, e.g., before, during, and/or after the addition of the additive fluid to the food product. For example, sweeteners, flavorings, emulsifiers, stabilizers, or the like may be introduced to the mixture. Any of the materials entering through any of the inlets may also be cooled, and/or under pressure.

In some cases, the additive fluid and the food product are mixed to form an emulsion, i.e., a mixture comprising discrete regions of a first, discontinuous phase within a second, continuous phase. The discrete regions may be, for example, small droplets or bubbles, which may be solid, liquid, or gaseous. For instance, the discrete regions may have an average cross-sectional dimension of less than about 1 mm, less than about 750 micrometers, less than about 500 micrometers, less than about 300 micrometers, less than about 100 micrometers, or less than about 50 micrometers. In some cases, the additive fluid forms the discontinuous phase and the food product for the continuous phase; in other cases, however, the additive fluid forms the continuous phase and the food product forms the discontinuous phase. For instance, the emulsion may comprise a continuous phase of $CO_2$ and one or more discontinuous phases of food product, a continuous phase of food product and a discontinuous phase of $CO_2$, etc. It should be understood that the food product phase of the emulsion with $CO_2$, may itself also be an emulsion. Thus, an emulsion of $CO_2$ and food product may comprise a first phase comprising $CO_2$, and two or more discontinuous phases, which together define a food product phase of the emulsion.

In some embodiments, however, when the additive fluid and the food product are mixed to form a mixture, no continuous phase is formed, and the mixture comprises two, three, four, or more discontinuous phases. For instance, one discontinuous phase may comprise $CO_2$, and two or more discontinuous phases may each comprise food product (one or more of which, as described above, may itself be an emulsion).

Thus, in one set of embodiments, the emulsion or mixture comprises discrete regions of one or more discontinuous phases, each of which may independently have an average cross-sectional dimension of less than about 500 micrometers, less than about 400 micrometers, less than about 300 micrometers, less than 200 micrometers, or less than about 100 micrometers.

The additive fluid and the food product are emulsified or otherwise mixed, according to one set of embodiments, by passing the additive fluid and/or the food product through a relatively small opening, e.g., a nozzle, a throttle valve, orifice, etc., from a relatively higher pressure to a relatively lower pressure in fluidic communication with the relatively higher pressure (i.e., across a pressure gradient). The additive fluid and the food product may be mixed using the nozzle or other opening, for instance, by spraying the food product through the opening into the additive fluid, by spraying the additive fluid through the opening through the opening into the food product, by mixing the additive fluid and the food product and urging the mixture through the opening, or the like. In some cases, more than one nozzle or other opening may be used. For instance, food product may be sprayed through one nozzle while the additive fluid is sprayed through the other nozzle. In some cases, by controlling the flow characteristics of the fluid(s) exiting through the opening, a desired degree of mixing or emulsification of the additive fluid and the food product may be achieved. The pressure difference between the higher initial pressure and the relatively lower pressure through the nozzle or other opening may be used to create the energy (e.g., kinetic energy) needed for mixing and/or emulsification to occur. If a nozzle is used, the nozzle may be, e.g., a pipe or a tube, the exact shape and/or dimensions of which can be selected by those of ordinary skill in the art using no more than routine skill. For example, the nozzle may be selected such that it sprays the fluid in a fan-shaped pattern, in a cone-shaped pattern, directionally, or the like.

Optionally, after forming the mixture of additive fluid and food product, additional components may be added to the mixture, for example, one or more additive fluids, additional food product, sweeteners, flavors, emulsifiers, stabilizers, etc. As above, any of these components may also be cooled and/or under pressure.

In certain embodiments of the invention, the mixture or emulsion is passed to the following stage of the process (discussed below) relatively quickly. For instance, the residence time between when the mixture or emulsion is formed and the following stage may be less than about 1 minute, less than about 45 seconds, less than about 30 seconds, less than about 20 seconds, less than about 15 seconds, less than about 12 seconds, less than about 10 seconds, less than about 8 seconds, less than about 6 seconds, less than about 5 seconds, or less than about 4 seconds. In one embodiment, the residence time is between about 6 seconds and about 3 seconds. Those of ordinary skill in the art will be able to determine the "residence time," as this term is used in the art, of a chamber or other system in which one or more fluids pass through. In certain cases, the residence time is kept relatively short since the mixture or emulsion of additive fluid and food product may be relatively unstable, i.e., the mixture or emulsion, when left undisturbed for an extended period of time, separates into one or more discrete layers or regions of a fluid that do not substantially contain the other fluids of the mixture.

After the additive fluid and the food product have been mixed to form a mixture, e.g., as an emulsion, the temperature of the mixture may then be lowered, according to some embodiments, such that at least a portion of the mixture substantially freezes, i.e., forms a solid phase (although there may be small pockets of material therein which have not completely frozen). It should be understood, however, that in other embodiments, the temperature does not have to be lowered, and if the temperature is lowered, mixing and lowering the temperature do not have to occur sequentially, but may also occur simultaneously, or on an overlapping basis, and the descriptions that follow with respect to decreasing the temperature of the mixture also apply to such other embodiments. Any suitable technique may be used to lower the temperature of the mixture. For example, the mixture may be exposed to cooler temperatures, e.g., within a heat exchanger, or the walls of the container holding the mixture may be cooled in some fashion, e.g., through the use of a coolant or refrigerant fluid. In some cases, a combination of techniques may be used.

In one set of embodiments of the present invention, the mixture is cooled by passing the mixture through a pressure gradient from a relatively high, initial pressure to a relatively low, final pressure, which may cause the additive fluid (or at least a portion) to change phase and/or expand and cool as it does so. For instance, a liquid additive fluid may change phase, as the pressure is reduced, to form a gas. In some cases, the gas, or at least a portion of the gas, may be separated from the food product and collected, e.g., to control the final pressure (some of the gas may also become incorporated into the food product, as discussed herein). The gas may also be recycled in some cases, as discussed in detail below.

In one embodiment, the mixture of additive fluid and food product is cooled by passing the mixture through a small opening, e.g., a nozzle, throttle valve, orifice, etc., from an initial, relatively higher pressure to a relatively lower pressure in fluidic communication with the relatively higher pressure. As above, if a nozzle is used, the nozzle may be, e.g., a pipe or a tube, and the spray may be fan-shaped, cone-shaped, directional, etc. The nozzle or other opening described here may be the same or different from the nozzle or other opening previously described with respect to mixing. The nozzle may be selected such that the mixture, upon passing through the nozzle, is able to rapidly expand volumetrically, and in some cases, such that at least a portion of the mixture changes phase, for example, from a liquid to a gas. For example, at least a portion of the additive fluid, the food product, or both, may substantially or completely freeze upon passage through the nozzle or other opening For instance, the temperature of the mixture may pass through the liquid-solid transition temperature of the mixture to cause at least a portion of the mixture to substantially freeze.

In one set of embodiments, the mixture passed through the nozzle or other opening is an emulsion, as previously described. In some cases, the discontinuous phase of the emulsion (or one or more of the discontinuous phases of the emulsion, if more than one discontinuous phase is present), prior to passage through the nozzle, is formed of discrete regions having an average cross-sectional dimension of no more than about 200% of the smallest cross-sectional dimension of the nozzle. In other cases, the discontinuous phase of the emulsion is formed of discrete regions having an average cross-sectional dimension of less than about 175%, less than about 150%, less than about 125%, less than about 100%, less than about 80%, less than about 60%, less than about 50%, less than about 40%, less than about 30%, less than about 20%, or less than about 10% of the smallest cross-sectional dimension of the nozzle.

In some instances, the passage of the mixture through the nozzle or other opening produces a "spray" of frozen food product, which is then collected. In some cases, the frozen food product thus formed is composed of relatively small particles or crystals, e.g., the particles or crystals may have an average dimension of less than about 75 micrometers, less than about 60 micrometers, less than about 50 micrometers, less than about 40 micrometers, less then about 30 micrometers, less than about 20 micrometers, less than about 10 micrometers, or less than about 5 micrometers, etc. as previously described. In some cases, after expansion, at least a portion of the additive fluid remains present within the frozen food product. By controlling the ratio of additive fluid to food product, as well as the temperature(s) and pressure(s) or pressure gradients of this process, the amount of additive fluid within the frozen food product may be controlled, and such process conditions can be determined by those of ordinary skill in the art using no more than routine skill and the benefit of the present disclosure. For example, the frozen food product may comprise about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% of additive fluid.

As an example, if the additive fluid contains $CO_2$, a portion of the $CO_2$ may become incorporated within the frozen food product, in some cases forming a carbonated frozen food product, such as previously described. The frozen food product may contain enough $CO_2$ such that the $CO_2$ is detectable or "tasteable" to an ordinary human. In some cases, the carbonated frozen food product may comprise solid carbon dioxide, i.e., dry ice, and/or a $CO_2$-based solid mixture, for example, solid or frozen particles including some frozen food and some solid $CO_2$. Of course, in other cases, the frozen food product that is produced is not carbonated.

In some cases, the spray of frozen food product may be collected as a powder, which may be in a "fluffy" state, i.e., formed of relatively small particles or crystals, for example, having an average cross-sectional dimension of less than about 500 micrometers. In some cases, the spray may result in finer particles or crystals, for example, having an average cross-sectional dimension of less than about 400 micrometers, less than about 300 micrometers, less than about 200 micrometers, less than about 100 micrometers, less than about 75 micrometers, less than about 60 micrometers, less than about 50 micrometers, less than about 40 micrometers, less then about 30 micrometers, less than about 20 micrometers, less than about 10 micrometers, or less than about 5 micrometers. The powder, in certain instances, may have a void volume fraction of at least about 0.5 immediately after formation, where the "void volume fraction" is the ratio of the volume of gas within the product to total volume of product. In other cases, the void volume fraction may be higher. For example, the void volume fraction may be at least about 0.55, at least about 0.6, at least about 0.65, at least about 0.7, or at least about 0.75. The gas within the powder may be $CO_2$ or other refrigerant, and/or other gases, for example, air.

In one set of embodiments, the mixture exiting from the nozzle or other opening may be controlled such that the frozen food that is formed is formed at a temperature selected to prevent subsequent crystal growth within the frozen food. For example, the temperature of the frozen food that is formed may be less than about 0° C., less than about −4° C., less than about −25° C., less than about −50° C., or less than about −80° C. The temperature of the mixture may be regulated, for instance, by controlling the pressure downstream of the nozzle or other opening, and/or controlling the temperature of the expansion chamber. For instance, the temperature of the expansion chamber may be controlled to be at a temperature of near or below about −4° C., near or below about −10° C., near or below about −20° C., near or below about −30° C., near or below about −40° C., near or below about −50° C., near or below about −60° C., etc.

In some embodiments, complex molded structures may be formed. For instance, a "spray" of frozen food may be collected in a molded structure. The molded structure may then be removed, yielding a molded frozen food. In some cases, the frozen food product may be compressed to form a denser material, e.g., within a mold.

After formation, the frozen food may then be collected, packaged, stored, shipped, and distributed, optionally within a pressurized container, as previously discussed, for example, such that the frozen food can be delivered to a human for consumption such that the frozen food remains in a frozen state.

Industrial quantities of frozen food may be produced in some embodiments using the systems and methods described herein, for example, at least about 10 gallons, at least about 30 gallons, at least about 100 gallons, at least about 300 gallons, at least about 1000 gallons, at least about 3000 gallons, or at least about 10,000 gallons of frozen food may be produced using the systems and methods described herein. Those of ordinary skill in the art will be aware of systems and methods for the production, packaging, storage, transport, and distribution of frozen food products. In addition, rapid throughputs may be achieved using the systems and methods described herein. For example, the food product may be passed through this system, and frozen and/or carbonated, at very rapid throughputs, for example, with a residence time (e.g., from a reservoir to a final product) of less than about 1 minute, less than about 45 seconds, less than about 30 seconds, less than about 20 seconds, less than about 15 seconds, less than about 12 seconds, less than about 10 seconds, less than about 8 seconds, less than about 6 seconds, less than about 5 seconds, or less than about 4 seconds.

It should also be noted here that processes described above are not intended to be limited only to the production of frozen foods, but can also be used to rapidly freeze any fluid. For example, by using only water and $CO_2$ or another suitable additive fluid, the above-described process may be used to generate ice (i.e., frozen water), and in some cases, with very short residence times, as previously described. Additionally, the fluid to be frozen using the above-described process does not necessarily have to be edible or fit for human consumption.

Figure 3:
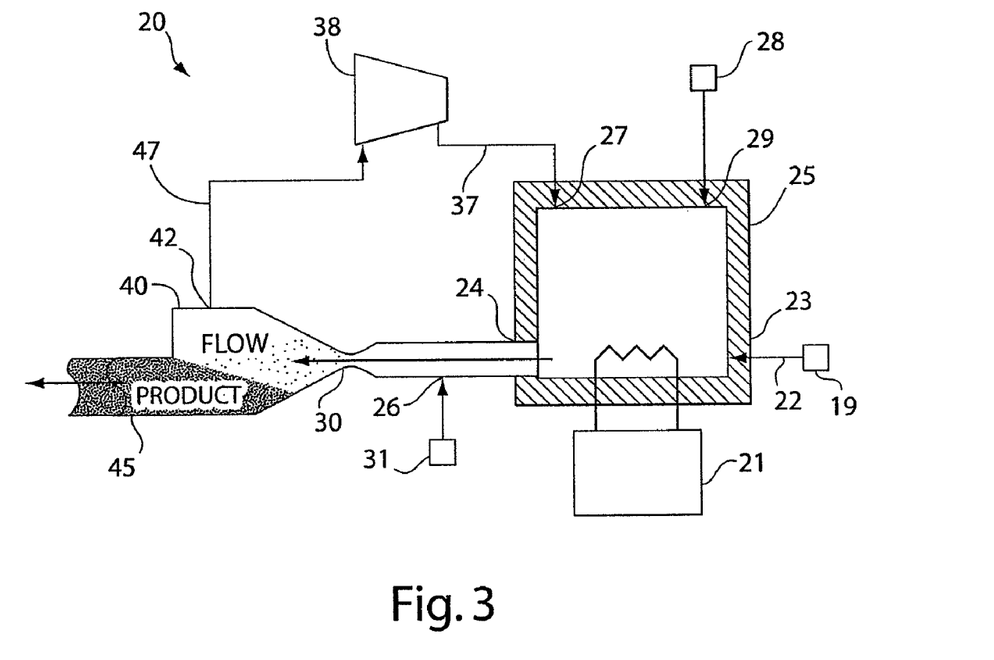
FIG. 3 illustrates an apparatus in accordance with an embodiment of the invention, useful for producing a frozen dessert or other frozen foods.

Yet another aspect of the invention is directed to apparatuses able to produce frozen foods, such as those described herein. One example is shown in FIG. 3, which uses $CO_2$ as an additive fluid to form a frozen dessert from a dessert mix. Of course, it should be understood that other additive fluids besides $CO_2$ can be used as well, as previously described, and other frozen foods may also be formed. In addition, in the embodiments that follow, a dessert mix is used, but this is by way of explanation only, and other food products, or other fluids, may also be used in other embodiments.

In FIG. 3, dessert mix 22 enters mixing chamber 25 through inlet 23. Chamber 25 may be cooled, for example, through a refrigeration unit 21. In some cases, chamber 25 is also pressurized, e.g., using the carbon dioxide. Within mixing chamber 25, dessert mix 22 is mixed with carbon dioxide, which may enter through either or both of inlets 27 and 29. The carbon dioxide entering through inlet 29 is fresh carbon dioxide originating from a source of carbon dioxide 28, while the carbon dioxide entering through inlet 27 is recycled carbon dioxide, as described below. Within mixing chamber 25, the carbon dioxide and the dessert mix are mixed together.

The mixture exits mixing chamber 25 through outlet 24 towards throttle 30. Optionally, liquid carbon dioxide may be injected into the mixture through inlet 26, before the mixture reaches throttle 30. As shown in FIG. 3, the carbon dioxide entering through inlet 26 arises from source 31, which may be the same source, or a different source, than carbon dioxide source 28.

The mixture of carbon dioxide and dessert mix passes through throttle 30 to enter expansion chamber 40. For example, the pressure of mixing chamber 25 may be greater than the pressure in expansion chamber 40, causing the mixture of carbon dioxide and dessert mix to pass through throttle 30. Within expansion chamber 40, the mixture is expanded as the pressure gradients, which causes the temperature of the mixture to decrease such that at least a portion of the dessert mix becomes frozen, thereby forming a frozen dessert. In some cases, the carbon dioxide may also be frozen as well, i.e., forming dry ice, and the carbon dioxide may be dissolved or encapsulated within the frozen dessert.

The frozen dessert exits chamber 40 through outlet 45 as a solid or a semi-solid product. In some embodiments, some of the carbon dioxide entering expansion chamber 40 may be vented off and recovered through outlet 42 into stream 47. The recovered $CO_2$ may be recycled into mixing chamber 25 in some cases, for example, by compressing the $CO_2$ to a higher pressure using compressor 38 prior to re-introducing the $CO_2$ into mixing chamber 25 via stream 37 and inlet 27.

It should be noted that the above description is by way of example only, and those of ordinary skill in the art will understand that this system, as described, can be modified as necessary, depending on a particular application. For example, in some embodiments, the carbon dioxide produced in expansion chamber 40 may be vented or used in other processes, and in some cases, chamber 25 may include additional inlets, for example, that are able to deliver flavorings, sweeteners, or the like to mixing chamber 25. Mixing chamber 25 may also contain, for example, an impeller or other stirring apparatus, baffles, scrapers, or the like, and mixing chamber may have any suitable shape, for example, a cylindrical shape.

Figure 4:
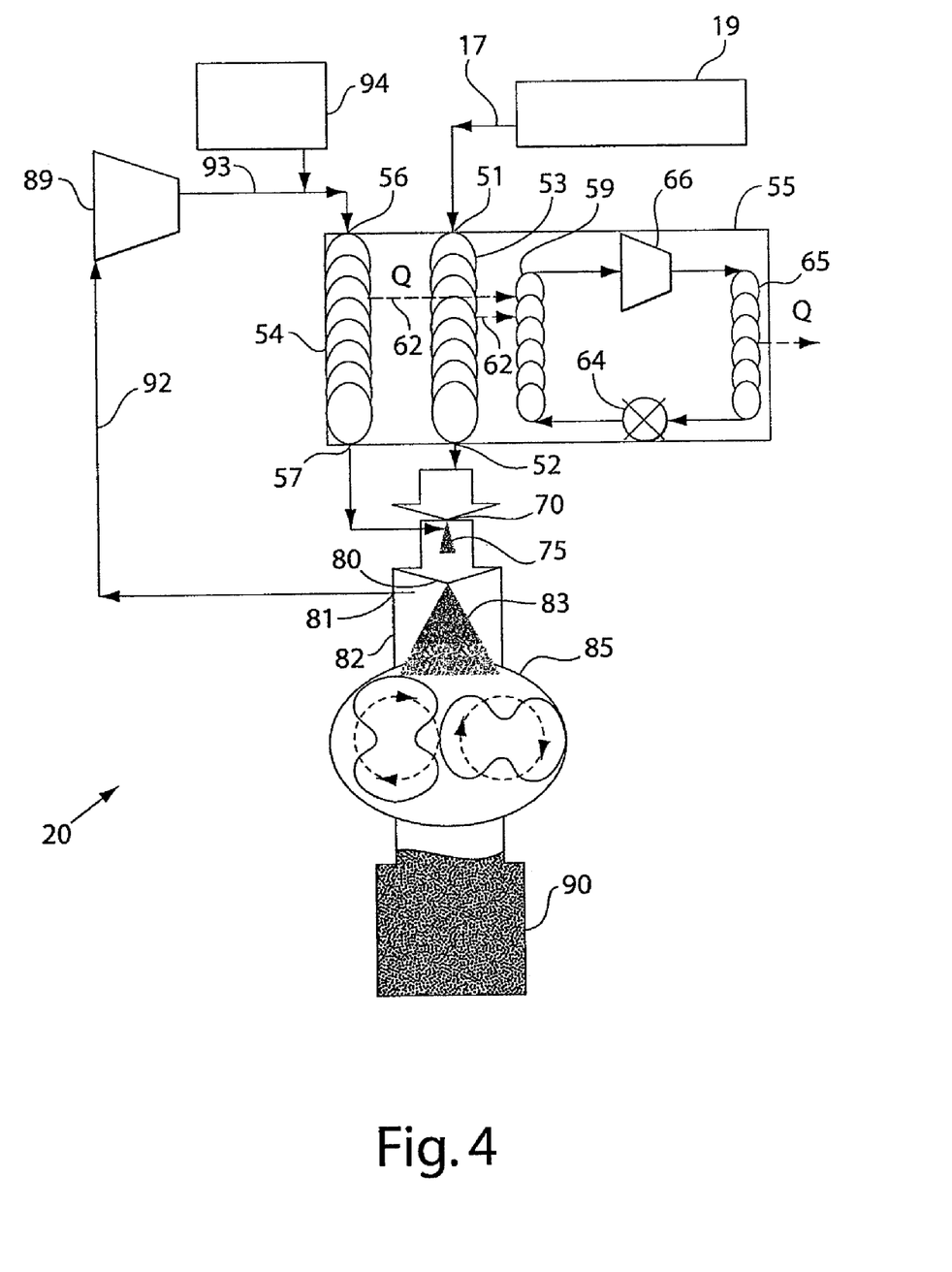
FIG. 4 illustrates an apparatus in accordance with another embodiment of the invention, useful for producing a frozen dessert or other frozen foods.

Another example of a suitable apparatuses able to produce frozen desserts is shown in FIG. 4, which uses $CO_2$, although it is to be understood that other additive fluids besides $CO_2$ can also be used, and other frozen foods can be formed. In FIG. 4, a dessert mix 17 is introduced from a dessert mix source 19 into an inlet 51 of chamber 55 in system 20. Within chamber 55, heat is lost by the dessert mix as it passes through heat exchange coils 53, thereby reducing its temperature. Thus, upon exiting at outlet 52, the dessert mix has a lower temperature than when it entered chamber 55. Also, within chamber 55, carbon dioxide originating from carbon dioxide source 94 and/or compressor 89 enters through inlet 56, and exits through outlet 57 at a lower temperature than at inlet 56, transferring heat away from heat exchange coils 54 in the process.

Heat ("Q") from heat exchange coils 53 and/or 54 is transferred into heat exchange coil 59, as indicated by dotted arrows 62. A refrigerant gas within heat exchange coils 59 is thereby heated, and then passed through compressor 66. Upon reaching heat exchange coils 65, heat is rejected to the external environment (e.g., to the ambient atmosphere, to another heat exchanger, etc. The refrigerant fluid then passes through throttle valve 64 and is returned to heat exchange coils 59.

After passing through chamber 55, dessert mix, exiting through outlet 52 is passed through a nozzle 70. Prior to entering nozzle 70, the dessert mix may be pressurized, e.g., to a pressure greater than normal atmospheric pressure, for example, at a pressure of about 800 psi. Within chamber 75, the dessert mix and the carbon dioxide (exiting through outlet 57) are mixed together. In some cases, an emulsion is formed between the dessert mix and the carbon dioxide. The pressure of the resulting mixture of carbon dioxide and dessert mix, as the mixture enters chamber 75, is lower than the pressures of the carbon dioxide or dessert mix entering the nozzle. For example, the pressure within chamber 75 may be about 600 psi.

Optionally within chamber 75, the mixture of carbon dioxide and dessert mix may also be cooled, and/or additional dessert mix, $CO_2$, sweeteners, flavors, emulsifiers, stabilizers, etc. may be added. The mixture is then passed through a second nozzle 80, which further cools the mixture, and causes at least some of the dessert mix to solidify. The pressure within chamber 82 may be lower than the pressure within chamber 75. For example, the pressure within chamber 82 may be about 150 psi to about 200 psi. The solidified dessert mix may form tiny particles, i.e., a spray 83. These particles are then collected as the frozen dessert. In FIG. 4, the particles are optionally passed through additional operations, for example, a vapor lock 85, before being finally collected and processed for storage and/or distribution 90, for example, at atmosphere pressure, or a packaging pressure.

Within expansion chamber 82, some of the carbon dioxide be collected via inlet 81. In some cases, substantially all of the carbon dioxide is collected in this manner. However, in other cases, a portion of the carbon dioxide may be incorporated within the final frozen dessert.

Carbon dioxide exiting expansion chamber 82 through inlet 81 is compressed, using compressor 89, to form liquid carbon dioxide. The liquid carbon dioxide is then passed through line 93 to inlet 56 of heat exchanger 55, as previously discussed. In some cases, additional carbon dioxide may be introduced into the line 93 from source 94, for instance, since some carbon dioxide may leave the system, e.g., through incorporation into the frozen dessert, or through other processes, for example, carbon dioxide which is lost as the frozen dessert is collected, through leakage, etc.

Figure 5:
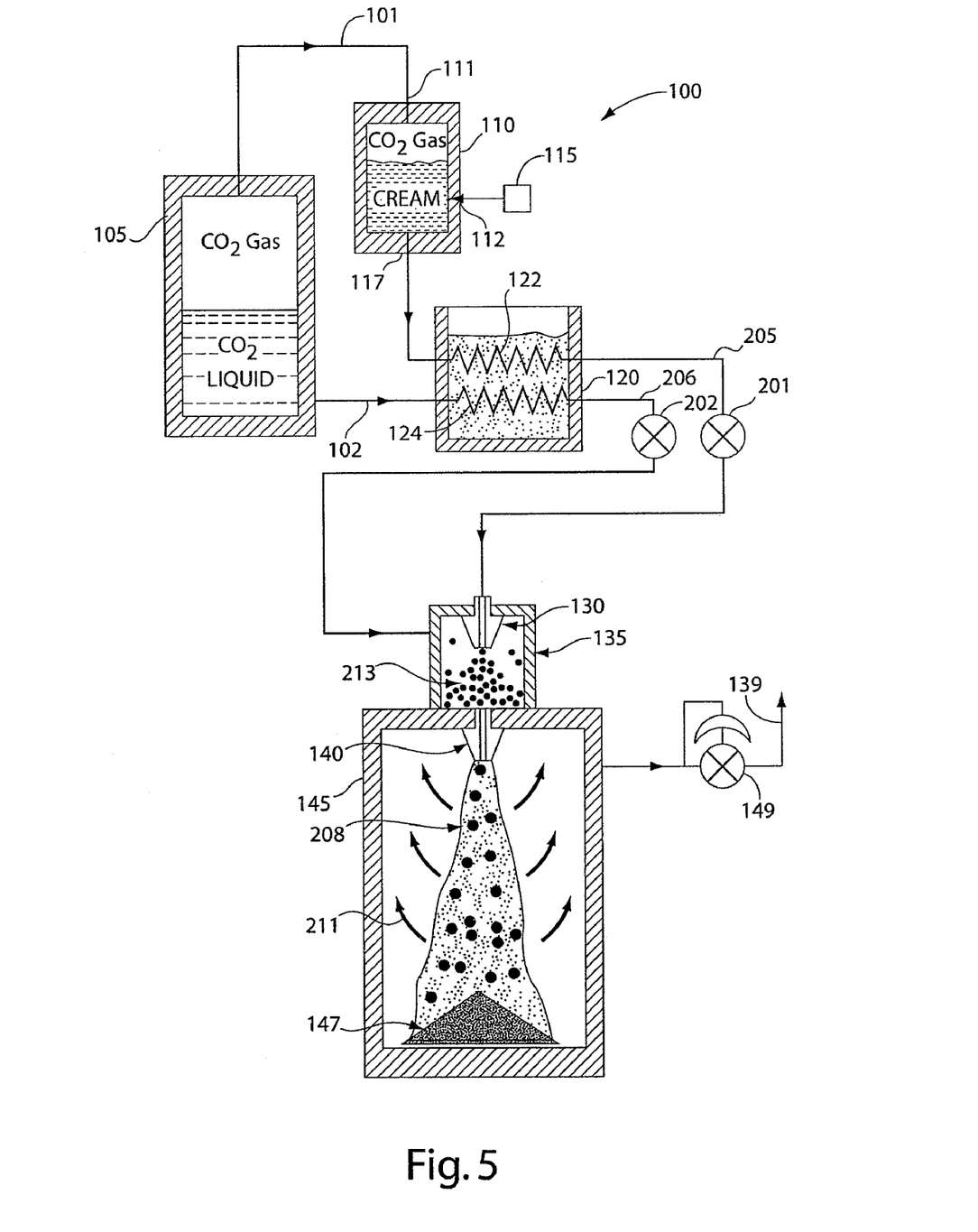
FIG. 5 illustrates an apparatus in accordance with yet another embodiment of the invention, useful for producing a frozen dessert or other frozen foods.

Yet another embodiment is illustrated in FIG. 5. In this embodiment, the carbon dioxide that is mixed into the dessert mix is initially produced using a source of frozen carbon dioxide that has both liquid and carbon dioxide present. In system 100 in FIG. 5, the carbon dioxide source 105 is a high-pressure $CO_2$ storage cylinder (or other source of pressurized $CO_2$) that includes, at room temperature (about 25° C.), liquid carbon dioxide and gaseous carbon dioxide at equilibrium, i.e., the carbon dioxide in the vapor phase is saturated. Carbon dioxide vapor passes through stream 101 into chamber 110, while liquid carbon dioxide is passed through stream 102 to cooling chamber 120. Carbon dioxide entering from inlet 111 via stream 101 pressurizes dessert mix originating from source 115, which enters chamber 110 through inlet 112. The carbon dioxide vapor pressurize the dessert mix in chamber 10 and directs the dessert mix through outlet 117 of chamber 110 to cooling chamber 120.

Within cooling chamber 120, the mixture of dessert mix and carbon dioxide passes through heat exchanger 122, while liquid carbon dioxide originating from chamber 105 passes through heat exchanger 124. Cooling chamber 120 may be cooled, for example, using an ice bath, i.e., at 0° C. The mixture of dessert mix and carbon dioxide, upon leaving heat exchange coils 122, is passed through line 205 to nozzle 130 into chamber 135, controlled using control valve 201. In chamber 135, an emulsion 213 of liquid carbon dioxide and dessert mix is thus formed. Nozzle 130 may also be used to further mix the dessert mix/carbon dioxide mixture, e.g., to form an emulsion.

Also within chamber 135, carbon dioxide from chamber 120 (via line 206 and control valve 202) enters the chamber, and cools the mixture, for example, to a temperature just above the liquid-solid transition temperature of the mixture. The mixture is then passed through nozzle 140 into expansion chamber 145, where at least a portion of the dessert mix solidifies as a "spray" or "snow" of individual particles 208, forming a solid frozen dessert 147, which collects at the bottom of chamber 145. The expansion chamber may be maintained at conditions suitable for causing at least a portion of the dessert mix to solidify. For example, expansion chamber 145 may be maintained at a temperature of about −40° C. In other embodiments, however, expansion chamber 145 may not present, i.e., the expansion of the mixture may occur to ambient temperature and/or pressure air.

A portion of carbon dioxide 211 within expansion chamber 145 is collected via a backpressure regulator 149, which regulates the pressure within the expansion chamber 145, such that the proper pressure difference is maintained between chamber 145 and chamber 135, thus allowing proper formation of the frozen dessert. The carbon dioxide vented via backpressure regulator 149 is then vented to the atmosphere in this embodiment via outlet 139. Of course, in other embodiments, as previously described, the carbon dioxide may also be recycled.

In this example, the pressure of expansion chamber 145 may be measured directly, and used to control the pressure, e.g., via backpressure regulator 149. For example, backpressure regulator 149 may measure the pressure with chamber 145, and control the outflow of gas through outlet 139 such that the pressure within chamber 145 is maintained. In other embodiments, however, the temperature of expansion chamber 145 may be measured, and the temperature may be used to control the pressure. For example, a sensor, able to measure temperature, may be positioned within expansion chamber 145, or otherwise positioned downstream of the second nozzle. The sensor may also be in sensing communication with backpressure regulator 149. Thus, by determining the temperature of the dessert mix after the dessert mix is passed to the second nozzle, the pressure of expansion chamber 145 may be appropriately regulated.

The invention also involves, in some aspects, the promotion of any of the frozen foods, apparatuses, etc. described herein. As used herein, "promoted" includes all methods of doing business including, but not limited to, methods of selling, advertising, assigning, licensing, contracting, instructing, educating, researching, importing, exporting, negotiating, financing, loaning, trading, vending, reselling, distributing, replacing, or the like that can be associated with the frozen foods, apparatuses, etc. described herein. Methods of promotion can be. performed by any party including, but not limited to, businesses (public or private), contractual or sub-contractual agencies, educational institutions such as colleges and universities, research institutions, hospitals or other clinical institutions, governmental agencies, etc. Promotional activities may include instructions or communications of any form (e.g., written, oral, and/or electronic communications, such as, but not limited to, e-mail, telephonic, facsimile, Internet, Web-based, etc.) that are clearly associated with the frozen foods, apparatuses, etc. described herein. As used herein, "instructions" can define a component of instructional utility (e.g., directions, guides, warnings, labels, notes, FAQs ("frequently asked questions"), etc., and typically involve written instructions on or associated with the frozen foods, apparatuses, etc. described herein. Instructions can also include instructional communications in any form (e.g., oral, electronic, digital, optical, visual, etc.), provided in any manner such that a user will clearly recognize that the instructions are to be associated with the frozen foods, apparatuses, etc. described herein.

U.S. Provisional Patent Application Ser. No. 60/628,606, filed Nov. 18, 2004, entitled "Ice Cream Production Using Carbon Dioxide Expansion," by Brisson, et al. is incorporated herein by reference.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of making a frozen food product, comprising acts of:
    passing at least liquid carbon dioxide and/or a dessert mix through a first nozzle;
    producing an emulsified liquid mixture comprising the liquid carbon dioxide and dessert mix; and
    volumetrically expanding the emulsified liquid mixture of the liquid carbon dioxide and dessert mix through a second nozzle defining a pressure gradient at least sufficient to cause (1) a phase change in at least a portion of the mixture and/or (2) an expansion of the carbon dioxide at least sufficient to substantially freeze at least a portion of the mixture.

2. The method of claim 1, comprising passing the dessert mix through the first nozzle.

3. The method of claim 1, wherein the mixture comprising the liquid carbon dioxide and the dessert mix, prior to volumetric expansion, has a pressure of at least about 10 atm.

4. The method of claim 1, comprising volumetrically expanding the mixture of carbon dioxide and dessert mix to a final pressure greater than about 5 atm.

5. The method of claim 1, wherein the mixture of carbon dioxide and dessert mix, after volumetric expansion, comprises at least about 0.07 mmol carbon dioxide/g dessert mix.

6. The method of claim 1, comprising passing both the liquid carbon dioxide and the dessert mix through the first nozzle.

7. The method of claim 1, wherein the mixture has a residence time after passing through the first nozzle and prior to volumetric expansion of less than about 15 seconds.

8. The method of claim 1, wherein volumetric expansion comprises creating a spray of the mixture of the liquid carbon dioxide and dessert mix.

9. The method of claim 1, wherein the emulsion mixture has an average droplet size of no more than about 500 micrometers.

10. A method of making a frozen food product, comprising acts of:
    passing at least liquid carbon dioxide and/or an ice cream product mix through a first nozzle;
    producing an emulsified liquid mixture comprising the liquid carbon dioxide and ice cream product mix; and
    volumetrically expanding the emulsified liquid mixture of the liquid carbon dioxide and ice cream product mix through a second nozzle defining a pressure gradient at least sufficient to cause (1) a phase change in at least a portion of the mixture and/or (2) an expansion of the carbon dioxide at least sufficient to substantially freeze at least a portion of the mixture.

11. The method of claim 10, comprising passing the ice cream product mix through the first nozzle.

12. A method of making a frozen food product, comprising acts of:
    passing at least a liquid refrigerant and/or a food product through a first nozzle, the refrigerant being gaseous under ambient temperature and pressure;
    producing an emulsified mixture comprising the liquid refrigerant and the food product; and
    volumetrically expanding the emulsified mixture through a second nozzle defining a pressure gradient at least sufficient to cause (1) a phase change in at least a portion of the emulsified mixture, and/or (2) an expansion of the refrigerant at least sufficient to substantially freeze at least a portion of the food product,
    wherein the portion of the food product that is frozen, immediately after formation, forms a powder having a porous structure having a void volume fraction of at least about 0.5, the porous structure containing the refrigerant.

13. The method of claim 12, wherein the food product is dessert mix.

14. The method of claim 12, wherein the food product is ice cream product mix.

15. A method of making a frozen food product, comprising acts of:
    passing at least liquid carbon dioxide and/or a food product through a first nozzle;
    producing an emulsified mixture comprising at least one of the liquid carbon dioxide and/or the food product; and
    volumetrically expanding the emulsified mixture through a second nozzle defining a pressure gradient at least sufficient to cause (1) a phase change in at least a portion of the emulsified mixture, and/or (2) an expansion of the carbon dioxide at least sufficient to substantially freeze at least a portion of the food product,
    wherein the portion of the food product that is frozen, immediately after formation, comprises carbon dioxide in an amount detectable by a human upon consumption of the frozen food product by the human.

16. The method of claim 15, wherein the food product is dessert mix.

17. The method of claim 15, wherein the food product is ice cream product mix.

* * * * *